(12) United States Patent
Lambert et al.

(10) Patent No.: US 6,439,468 B1
(45) Date of Patent: Aug. 27, 2002

(54) ACOUSTIC HVAC CONTROL SYSTEM

(75) Inventors: David K. Lambert, Sterling Heights;
Dale Lee Partin, Ray Township;
Taeyoung Han, Bloomfield Hills;
Michel Farid Sultan, Troy, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/909,117

(22) Filed: Jul. 19, 2001

Related U.S. Application Data

(60) Provisional application No. 60/282,578, filed on Apr. 9, 2001.

(51) Int. Cl.[7] ................................. F24F 7/007
(52) U.S. Cl. ...................... 236/49.3; 236/91 C
(58) Field of Search ............... 374/119; 236/49.3, 236/91 C

(56) References Cited

U.S. PATENT DOCUMENTS

| | | | |
|---|---|---|---|
| 5,360,268 A | * | 11/1994 | Hayashi et al. ............. 374/117 |
| 5,437,506 A | * | 8/1995 | Gray .......................... 374/119 |
| 5,518,176 A | | 5/1996 | Turner et al. ............... 236/49.3 |
| 5,624,188 A | * | 4/1997 | West .......................... 374/119 |

* cited by examiner

*Primary Examiner*—William E. Tapolcai
(74) *Attorney, Agent, or Firm*—Patrick M. Griffin

(57) ABSTRACT

The present invention is directed to a system for acoustically controlling an automotive or aircraft vehicle's automatic climate control system. The acoustic HVAC control system determines an average air temperature using an ultrasonic transducer. The transducer transmits and receives an ultrasonic pulse along a pre-selected path within the vehicle's interior and concurrently measures the interval time between sending and receiving the pulse. An average air temperature is calculated based on the interval time. The determined average air temperature is evaluated against a pre-selected setpoint temperature and determines whether the vehicle's automatic climate control system controller controls an air blower fan speed, discharge temperature, and air delivery mode to the cabin to adjust the vehicle's interior air temperature near an occupant to a desired temperature. The average air velocity along the pre-selected path can also be determined from the difference in interval times for ultrasonic pulses traveling in opposite directions along the pre-selected path.

18 Claims, 1 Drawing Sheet

ACOUSTIC HVAC CONTROL SYSTEM

This application claims the benefit of prior Provisional Patent Application Ser. No. 60/282,578 filed Apr. 9, 2001.

TECHNICAL FIELD

It has been found that thermal comfort for an occupant in a vehicle is improved significantly when the air temperature is measured at the occupant's breath-level. The present invention is directed to a control system that works in conjunction with an automatic climate control system to measure air temperature at or adjacent to a vehicle occupant's breath-level and outputs a signal to the climate control system in order to improve the thermal comfort for the occupant. The present invention uses ultrasonic transducers to generate and receive acoustic waves that are propagated along a pre-selected path that passes adjacent to the vehicle occupant's breath-level. The transmission time of the acoustic waves is used to determine an average air temperature. The present invention correlates well with the temperature measured by a thermocouple in air at breath-level. This invention may also be used to measure air flows within the vehicle cabin.

BACKGROUND OF THE INVENTION

Automatic control of air temperature in a vehicle is made difficult both by the unpredictable nature of the cabin thermal environment and because people have different perceptions of thermal comfort. The factors that affect thermal comfort can be generally attributed to those environmental factors that affect body heat loss. In a vehicle interior, thermal comfort is mainly affected by the distribution of air temperature and air velocity around the occupant. Also important are the occupant's clothing, the amount of radiant heating and the humidity in the passenger cabin. A vehicle as used here refers to an automotive vehicle such as a car, bus, truck, van, sport utility vehicle, recreation vehicle, etc, or to an aircraft.

Several systems are presently used in vehicles for automatic climate control (ACC). Most current vehicles utilize an in-car sensor, located in the instrument panel near the base of the steering wheel, which draws air through a port from the vehicle's passenger cabin over a thermistor that measures the temperature of the air passing through the port. The sensor outputs the temperature to the vehicle's heating, ventilation and air conditioning (HVAC) system to control heating and cooling. Some vehicles also use multiple thermistors located at various points in the vehicle interior, and then average the temperature throughout the cabin.

In use, the ACC system has transient modes, such as warm-up and cool-down. During steady state operation, it tries to maintain the interior temperature at a desired set point. Present in-car temperature sensors, however, are prone to response-time lag and drift. This leads to control problems during some transient modes and even under steady state conditions.

More recently, some vehicles have begun using an infrared detector that measures the average surface temperature of persons or objects in a selected field of view based on a thermistor that measures air temperature and a thermopile detector that measures radiant flux from the field of view, such as, for example, disclosed in U.S. Pat. No. 5,518,176. Such systems, however, tend to be somewhat unreliable in accurately measuring air temperature because the temperature of a solid surface in a vehicle's interior changes slowly in response to changes in air temperature. Therefore, during a fast transient, the output from a sensor that measures the temperature of solids, such as an infrared detector, does not correlate well with the actual air temperature in the vehicle.

Models are known in the art for determining and controlling the temperature distribution inside a vehicle cabin using various inputs to the ACC controller. In addition to the in-car thermistor or infrared-based sensor, other inputs to current ACC systems include sensors of outside air temperature and sunlight exposure to the cabin, known as solar heat load. The desired temperature setting selected by each occupant is yet another input factor, or a default setting if none is selected by some occupants. Additional inputs include interior vehicle air flows, air vent discharge temperature, the thermal history of the vehicle, and the presence of occupants. The present invention may be used to replace the current in-car thermistor-based or infrared-based sensor and obtain a much improved measurement of bulk air temperature near or adjacent to the breath-level of one or more vehicle occupants. By accurately and rapidly measuring the average air temperature and average air velocity along a pre-selected path, the models known in the art can be used to find the temperature distribution in a vehicle cabin more accurately and more quickly than is currently done with the in-car sensor. It has been surprisingly found, however, that thermal comfort of a vehicle's occupant correlates very well with the temperature measured by a thermocouple, hanging in the air, positioned at breath-level in front of that occupant. It has further been found that the breath-level measurement is substantially better than the measurement of air temperature using in-car sensors or infrared temperature detectors known in the art.

SUMMARY OF THE INVENTION

The present invention is directed to an acoustic HVAC control system that determines the average air temperature along a pre-selected path to provide more accurate and timely climate control of a vehicle interior. It has been found that existing temperature measurement provides a poor correlation to thermal comfort of an occupant and that the correlation is much better when the temperature is measured at breath-level in front of the occupant's (such as the driver's) face. However, until the present invention, temperature measurement at such a location has not been feasible.

The present invention finds good agreement between breath-level temperature and the average air temperature along a pre-selected path even when the path is adjacent to the occupant and not directly in front of the occupant's face. For example, good agreement is found when the path is along the occupant side of the roof console that is mounted on the headliner near the occupant. Good agreement is also found when the path is along the top of the instrument panel or between the "A" pillar near a front seat occupant and the rear view mirror. Further, the path could be along the side of the occupant's seat or headrest, a rear view mirror, on the headliner above the occupant or from one part of the instrument panel to another. For the particular case of the vehicle's driver, the path is preferably from one part of the steering wheel or steering column to the another or to the instrument panel. For an occupant of a rear seat, the acoustic path is preferably from one part of the seat-back in front of the occupant to another (e.g., top-to-bottom or side-to-side). For an occupant of an aircraft seated in a seat on one side of the aircraft (that is, a window seat), the acoustic path is preferably parallel to and near that side of the aircraft. Thus, the exact location of the path adjacent to the occupant or to the occupant's breath-level is less important in that the path averages the air temperature near or adjacent to the occupant's breath-level, thus measuring the local average air temperature and not just an average temperature of the air in the entire vehicle. This local measurement can then be repeated if desired for other locations in the vehicle to facilitate zone control by the ACC system to improve thermal comfort for occupants in those locations.

It is however important that most of the path of the acoustic wave be spatially separated from the solid surfaces in the vehicle. This is because of the thermal boundary layer in the air near such surfaces. At such surfaces, the air velocity is zero and the air temperature is the same as the temperature of the solid. Outside of the boundary layer, which can for example be as much as 1 centimeter thick under some circumstances in the vehicle, turbulent flow tends to equalize the bulk air temperature. Thus, it is desirable to have the majority of the acoustic path be outside the boundary layer where it measures the bulk air temperature. Obviously, the part of the boundary layers which are associated with the solid surfaces of an ultrasonic transducer and an acoustic reflector are inevitably part of the acoustic path. In the present invention, an acoustic path length (between the transducer and the reflector) is contemplated to be in the range of about 10 cm to about 200 cm, with an acoustic path length of about 50 cm being preferred.

This understanding of the thermal boundary layer also helps to appreciate a problem with the usual thermistor-based in-car sensor. Being mounted inside a protective enclosure which is typically on the vehicle instrument panel, the in-car sensor is inside the boundary layer and thus does not do a good job of measuring the air temperature in the vehicle or near the vehicle occupant. Similarly, an infrared-based system measures the temperature of a solid surface, which is inside the boundary layer. These problems are especially important during thermal transients, such as during the period of warming up a cold-soaked vehicle or cooling down a hot-soaked vehicle. In these cases, the fast measurement time of the present invention, which can be much faster than one second, is an additional advantage.

As mentioned above, this acoustic measurement technique can be repeated for other vehicle occupants in different positions or zones. Alternatively, a measurement of average air temperature along a pre-selected path adjacent to the breath-level of one vehicle occupant using this acoustic technique can be used to infer the temperature near other vehicle occupants using other inputs to the automatic climate control system and models known in the art. These other inputs may include solar heat load (including the direction of the sun relative to the vehicle), outside air temperature, interior vehicle air flows, air vent discharge temperature, a setpoint temperature which was pre-selected by another occupant or by a default value, the thermal history of the vehicle, and the presence of another occupant. An average air velocity along the pre-selected path can also be found by its effect upon the difference in interval time for acoustic pulses traveling in opposite directions along the pre-selected path. This furnishes additional useful input to the ACC to aid in modeling the thermal environment of the occupants.

The present invention is based on the principle that the speed of sound depends on air temperature and that average air temperature along a path is given by the time that an acoustic pulse takes to pass between two fixed points. In a vehicle cabin, the relationship is essentially that sound velocity is proportional to the square root of the air temperature (in degrees Kelvin).

Sound propagates at constant velocity c away from a source. The dependence of the speed-of-sound on environmental variables such as temperature and humidity is well understood. Sound involves the compression and expansion of air. There is a restoring force that tends to return the pressure p (and density ρ) back toward the static value. As the air expands and contracts, the compression and expansion causes it to heat and cool, respectively. The expansion and contraction occurs fast enough so that on the distance scale of a half wavelength, heat flow is negligible between adjacent volumes of high and low pressure. Consequently, $$c^2 = \left(\frac{\partial p}{\partial \rho}\right), \tag{1}$$

where the partial derivative refers to a process with zero heat flow through the sample's boundary. For a gas sample taken through such a process, the result is, $$c = \sqrt{\gamma RT/\mu} \tag{2}$$

where R is the ideal gas constant, T is the absolute temperature (in K), $\mu$ is the average molecular weight of the gas molecules, and $$\gamma = c_p/c_v \tag{3}$$

where $c_p$ is the heat capacity of the gas at constant pressure and $c_v$ is the heat capacity of the gas at constant volume.

Inserting known values for dry air, R=8.31447 J/(mol K), and $\mu$=2.8964×10$^{-2}$ Kg/mol. At 300 K, γ=1.4000 and at 400 K, γ=1.3951. Approximating γ(T) as a linear function that passes through these two points, in dry air at 20° C. (293.15 K), γ=1.4003 and, by Eq. (2) c=343.3 m/s. In comparison, the measured c in dry air at 20° C. is 343.6 m/s.

Therefore, from Eq. (2), c is about proportional to √T with T in Kelvin (T[K]=T[°C.]+273.15). This temperature dependence is the basis of the air temperature measurement. A change of air temperature by 1° C. from 20 to 21° C., increases c by a factor of 1.00169. Thus, to determine T to an accuracy of 1° C., c must be measured with relative accuracy of about 1.7×10$^{-3}$.

The expression for c in Eq. (2) is independent of pressure p at constant T. This simplifies the determination of T from measured c; the relationship does not involve air pressure, so p does not need to be measured.

The present invention is directed to a control system that uses an acoustic transducer to determine the average air temperature along a path within a vehicle's interior. The measured temperature is used as an input to the vehicle's automatic climate control (ACC) system.

The present invention may be used to acoustically control an automatic climate control system for a vehicle's interior by determining an average air temperature adjacent to a vehicle's occupant using at least one ultrasonic transducer. The transducer transmits and receives an ultrasonic pulse along a pre-selected path within a vehicle's interior and concurrently measures the propagation time along the path. A signal processing circuit is then used to compute a signal which is related to the average air temperature along the acoustic path. For example, this signal may be an analog voltage which is proportional to the average air temperature, or a digitally encoded format may be used. In either case, the ACC controller is programmed to recognize the signal representing the determined average air temperature. The determined average air temperature is evaluated against a pre-selected setpoint temperature using a controller to determine whether to activate the blower fan, the air conditioner or the heater for a sufficient period of time to adjust the vehicle's interior air temperature to a desired temperature.

The change in the speed of sound caused by air velocity—the Doppler effect—also needs to be considered. If sound propagates a distance d in one direction from a source to a receiver, and if the component of air velocity along the vector from the source to the receiver is u, then the propagation time is $$\Delta t = \frac{d}{c+u}. \qquad (4)$$

Thus, based on a measurement directly along a straight line from a source to a receiver, the effect of the component of air velocity along the path is simply to add to c. To cause an apparent 1° C. change in T, the flow velocity is 0.6 m/s. For comparison, the air velocity from the AC outlets at high fan level is typically 5 m/s. The air velocity near an occupant is typically less than 1 m/s, and this would change measured temperature on the order of 1° C.

The Doppler effect cancels out to first order if the sound propagates from a source to a reflector and then returns back along the same path to the source where it is detected. With a constant u along the entire path $$\Delta t = \frac{d}{c+u} + \frac{d}{c-u} = \frac{2d}{c-(u^2/c)} \qquad (5)$$

Thus, if the same transducer is used to send and receive ultrasonic pulses, the effect of u is to change the apparent c by $u^2/c$. If u is 5 m/s and c is 345 m/s then the apparent change in c is 0.072 m/s. This is equivalent to a change in T of only 0.12° C.

This shows that the effects of air velocity on the measurement of temperature are extremely small for cases of practical interest, especially if the velocity of sound is averaged over both directions along a pre-selected path. In some cases, this may not be necessary. However, if the interval times for ultrasonic pulses traveling in opposite directions along the same pre-selected path are measured, then the average air velocity along this path, u, can be determined.

DESCRIPTION OF THE PREFERRED EMBODIMENT

Figure 1:
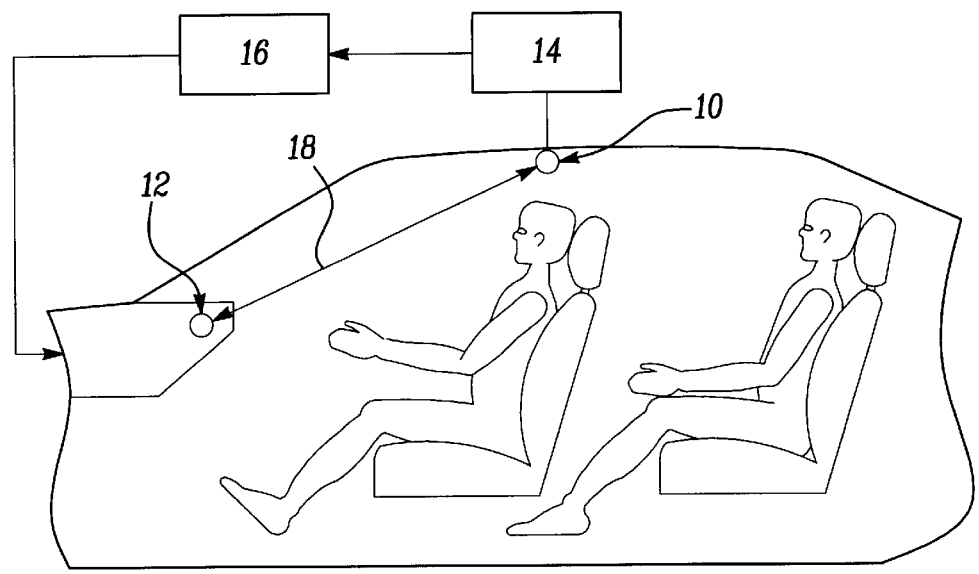
FIG. 1 shows a diagram of an acoustic HVAC system of the present invention having one ultrasonic sensor (transducer) and a reflector.

The present invention is shown in FIG. 1. As shown, the control system comprises an ultrasonic transducer 10 and an interface circuit (not shown), a reflector 12, and a counter-timer and signal processing circuit 14. The counter-timer and signal processing circuit 14 is connected to the vehicle's automatic climate control (ACC) controller 16. In use, an ultrasonic pulse is initiated by a pulse-generator in the interface circuit that creates a voltage pulse. This triggers the interface circuit to output a voltage pulse to the transducer. In response, the transducer 10 outputs an ultrasound pulse at its resonant frequency, which rapidly decays in amplitude. The pulse of ultrasound is radiated into the air and is directed along a pre-selected path 18 within the vehicle's interior that runs from the transducer 10, past a vehicle occupant at about breath-level, and to a reflector 12. Upon return, the reflected ultrasound pulse causes the transducer 10 to output a voltage signal to the interface circuit. It is amplified there, and the amplified signal is output to the counter-timer and signal processing circuit 14. The counter-timer and signal processing circuit 14 measures the interval time $\Delta t$ that begins with the arrival of the leading edge of the pulse from the pulse generator and ends with the detection of the reflected ultrasonic pulse. This is the time delay for the ultrasound pulse to travel from the transducer 10 to the reflector 12, and back again. The counter-timer and signal processing circuit 14 computes a signal from the measured interval time that is related to or encodes the average air temperature along the path 18. This signal is then output to the ACC controller 16 where it is used as an input for climate control.

The interface circuit and the counter-timer and signal processing circuit 14 may be packaged as separate units or may be integrated with the transducer 10 or with other circuitry inside the ACC controller 16. For example, a Motorola HC11 series microcontroller has a time interval resolution of about one microsecond which is fast enough to serve as a counter-timer and for the signal processing circuit. It would thereby perform these functions and that of the interface circuit, and then output an encoded signal related to the average temperature along the acoustic path. The same microcontroller may be used as the ACC controller. Use of such a controller facilitates implementation of other signal processing functions such as, for example, the use of automatic gain control to self-compensate for gain variation, and the use of a multi-stage trigger that would allow reliable detection of the pulse waveform so that triggering occurs at a predetermined zero-crossing near the center of the pulse.

While this embodiment uses a single voltage pulse to excite the transducer to oscillate at its resonant frequency, one can alternatively use a short burst of voltage pulses at approximately the transducer resonant frequency as is known in the art.

Figure 2:
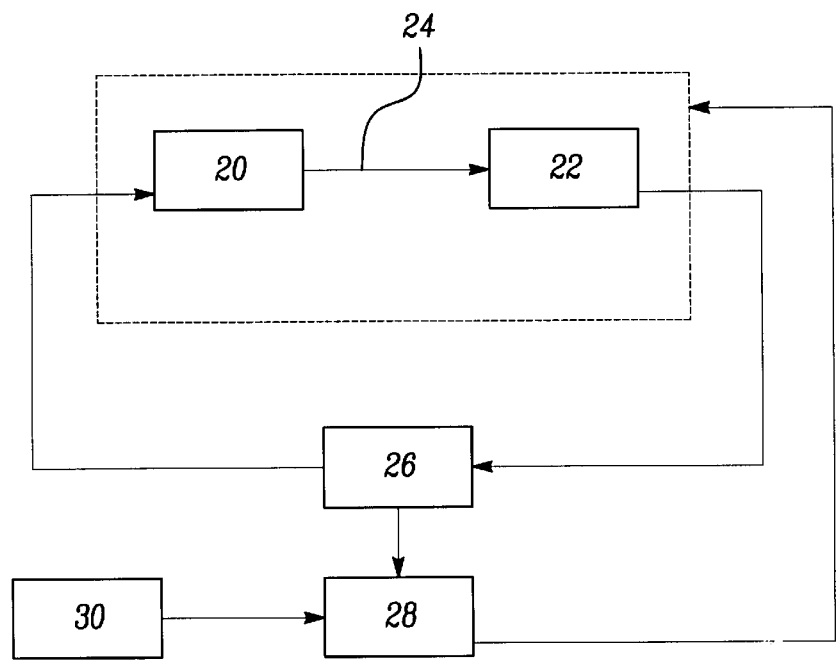
FIG. 2 shows a schematic diagram of an acoustic HVAC system of the present invention having two ultrasonic sensors (transducers).

A schematic diagram of an alternative embodiment of the present invention is shown in FIG. 2. As shown, two ultrasonic transducers 20, 22 are arranged within a vehicle's interior so that a pulse 24 generated from one transducer is detected by the second transducer. The time required for the ultrasonic pulse to propagate from the source transducer to the detector transducer is measured by a counter-timer and signal processing circuit 26. The measured time is output to the vehicle's ACC controller 28 where it is used as an input for climate control.

When two transducers are used in the present invention, the effect of air velocity on the measured transit time can be greatly reduced by averaging the transit time between counter-propagating paths. In a preferred embodiment, one transducer sends a pulse to the second transducer, waits a calibrated "dead time" to allow pulse reflections to die out, and then transmits a pulse back from the second transducer to the first transducer. The sum of the two propagation times is used to determine the average air temperature along the path. In another embodiment, both transducers transmit pulses simultaneously, and then both transducers receive pulses from the other. Averaging the two pulse transit times greatly reduces effects of air velocity. The present invention may be used with any number of transducers to accomplish the desired precision and flexibility in air temperature measurement.

Referring to FIG. 2, other sensors 30 may also provide input to the ACC controller such as a thermistor that is used to provide a baseline measurement for temperature calibration and control. In such an embodiment, if the difference in the temperature measured by the thermistor and that determined ultrasonically is higher or lower than a certain setpoint, the ACC system may optionally default to a temperature measured by another sensor such as the thermistor. Based on all of the inputs, the ACC controller 28 provides the outputs as necessary to control the blower speed, discharge temperature and air delivery mode to the cabin.

Any acoustic source may be used as the transducers such as speakers and microphones that are already in the vehicle. For example, one of the speakers used for the stereo system may be used as the acoustic transducer source and a microphone provided for voice control of vehicle functions may be used as the other transducer.

A particularly preferred transducer is a piezoelectric ultrasonic transducer such as model number ITC-9081 available from International Transducer Company of Santa Barbara, Calif., that has a resonant frequency of 92 kHz. A suitable interface circuit (ITC-9100 developer's kit) to power the transducer is also available from the company.

The reflector can be any suitable acoustically reflective material such as, for example, a window, a corner-cube (hidden behind cloth), or other suitably reflective surface in the cabin area. An acoustic transducer that is already being used for another purpose may also be used. For example, in a vehicle that uses pulses of ultrasound to detect out-of-position occupants for air bag suppression, a reflector could be provided, and the signal from the reflector could be used to measure the air temperature. Multiple reflectors may further be used to provide redundant paths so that the system will continue to function if one or more paths are blocked.

While the present invention has described using an acoustic HVAC control system to measure the average temperature adjacent to a vehicle occupant to facilitate the ACC system controlling the temperature near that occupant, additional acoustic HVAC control systems can be used for multiple zone control. In this way, the temperature adjacent to more than one vehicle occupant can be separately controlled. For example, two front seat occupants in an automotive vehicle can separately control their thermal environments. Alternatively, the temperature of the front seat vehicle occupants can be separately measured and controlled from the temperature of the rear seat occupants.

While the preferred embodiment of the present invention has been described so as to enable one skilled in the art to practice the acoustic HVAC control system of the present invention, it is to be understood that variations and modifications may be employed without departing from the concept and intent of the present invention as defined in the following claims. The preceding description is intended to be exemplary and should not be used to limit the scope of the invention. The scope of the invention should be determined only by reference to the following claims.

What is claimed is:

1. In a vehicle having an automatic climate control system including a controller, an acoustic heating, ventilation and air conditioning control system capable of determining a localized air temperature within the vehicle comprising:

an acoustic transmitter adapted to be mounted within the vehicle for transmitting an ultrasonic pulse along a pre-selected path in the vehicle adjacent to a breath-level of an occupant, said pre-selected path being spatially separated from any solid surfaces within the vehicle such that a majority of said pulse maintains a spatial relationship with a thermal boundary layer of the solid surfaces;

an interface circuit connected to said acoustic transmitter for exciting said acoustic transmitter electrically;

an acoustic receiver adapted to be mounted in the vehicle for receiving said ultrasonic pulse with said acoustic transmitter and said acoustic receiver being located at one end of said pre-selected path; and a counter-timer and a signal processing circuit connected to both of said acoustic transmitter and said acoustic receiver for measuring a time interval from said transmission until said receipt of said ultrasonic pulse and sending a corresponding signal which encodes an air temperature to said controller of said automatic climate control system wherein said controller uses said signal to control a temperature within the vehicle near the occupant.

2. The acoustic heating, ventilation and air conditioning control system of claim 1 wherein said acoustic transmitter and said acoustic receiver are located on the same end of said pre-selected path.

3. The acoustic heating, ventilation and air conditioning control system of claim 2 wherein a single acoustic transducer functions as both said acoustic transmitter and said acoustic receiver.

4. The acoustic heating, ventilation and air conditioning control system of claim 1 wherein said acoustic transmitter and said acoustic receiver are located on different ends of said pre-selected path.

5. The acoustic heating, ventilation and air conditioning control system of claim 2 further comprising a reflector capable of receiving and returning said ultrasonic pulse along said pre-selected path wherein said reflector is located at the opposite end of said pre-selected path from said acoustic transmitter and said acoustic receiver.

6. The acoustic heating, ventilation and air conditioning control system of claim 1 wherein the controller outputs a signal corresponding to the air temperature to the climate control system to evaluate the air temperature against a pre-selected setpoint temperature to determine whether to activate an air blower fan speed, an air conditioner or a heater for a sufficient period of time to adjust an interior air temperature to a desired temperature.

7. In a vehicle having an automatic climate control system including a controller, an acoustic heating, ventilation and air conditioning control system capable of determining a localized air temperature within the vehicle comprising:

an acoustic transmitter adapted to be mounted within the vehicle for transmitting an ultrasonic pulse along a pre-selected path within the vehicle;

an interface circuit connected to said acoustic transmitter for exciting said acoustic transmitter electrically;

an acoustic receiver adapted to be mounted within the vehicle for receiving said ultrasonic pulse; and a counter-timer and a signal processing circuit connected to both of said acoustic transmitter and said acoustic receiver for measuring a time interval between transmitting and receiving said pulse along said pre-selected path to determine the local air temperature within a portion of the vehicle and processing additional inputs selected from the group consisting of solar heat load, outside air temperature, interior vehicle air flows, one or more setpoint temperatures which were pre-selected by each vehicle occupant or by default values, presence of vehicle occupants, air vent discharge temperature, thermal history, average air velocity within the vehicle, thermistors, and combinations thereof, wherein said counter-timer and signal processing circuit outputs a signal to said controller of said automatic climate control system such that said controller controls one or more of air blower speeds, discharge temperatures and air delivery modes to optimize a thermal comfort within the vehicle.

8. The acoustic heating, ventilation and air conditioning control system of claim 7 wherein said acoustic transmitter and said acoustic receiver are located on the same end of said pre-selected path.

9. The acoustic heating, ventilation and air conditioning control system of claim 8 wherein a single acoustic transducer functions as both said acoustic transmitter and said acoustic receiver.

10. The acoustic heating, ventilation and air conditioning control system of claim 8 further comprising a reflector capable of receiving and returning said ultrasonic pulse along said pre-selected path wherein said reflector is located at the opposite end of said pre-selected path from said acoustic transmitter and said acoustic receiver.

11. The acoustic heating, ventilation and air conditioning control system of claim 7 wherein said acoustic transmitter and said acoustic receiver are located on different ends of said pre-selected path.

12. The acoustic heating, ventilation and air conditioning control system of claim 7 wherein the controller outputs a signal corresponding to the air temperature to the climate control system to evaluate the air temperature against a pre-selected setpoint temperature to determine whether to activate an air blower fan speed, an air conditioner or a heater for a sufficient period of time to adjust an interior air temperature to a desired temperature.

13. A method of acoustically controlling an automatic climate control system within an interior of a vehicle using at least one ultrasonic transducer having an interface circuit with a counter-timer, signal processing circuit and a controller comprising the steps of:

determining a localized air temperature adjacent to the breath-level of a vehicle occupant by transmitting and receiving an ultrasonic pulse along a pre-selected path adjacent the vehicle occupant using the ultrasonic transducer and the interface circuit, measuring a time interval between the transmission and receipt of said ultrasonic pulse using the counter-timer, calculating the air temperature based upon the time interval using the signal processing circuit;

sending a signal from the signal processing circuit to the controller of said automatic climate control system;

evaluating the air temperature against a pre-selected setpoint temperature to determine whether to activate a blower fan, air conditioner or heater for a sufficient period to adjust the air temperature in the vehicle.

14. A method of claim 13 wherein one transducer transmits said ultrasonic pulse at one end of said pre-selected path and another transducer receives said ultrasonic pulse at the opposing end of said pre-selected path.

15. A method of claim 13 wherein one transducer transmits and receives said ultrasonic pulse at one end of said pre-selected path.

16. A method of claim 15 wherein said ultrasonic pulse is received and returned at the opposing end of said pre-selected path by a reflector.

17. A method of using the acoustic heating, ventilation and air conditioning control system of claim 13 wherein the controller processes additional inputs selected from the group consisting of solar heat load, outside air temperature, interior vehicle air flows, air vent discharge temperature, a setpoint temperature which was pre-selected by another occupant or by a default value, the thermal history of the vehicle, and presence of other occupants, average air velocity within the vehicle, thermistors, and combinations thereof such that the controller can optimize a thermal comfort within the vehicle.

18. A method of using the acoustic heating, ventilation and air conditioning control system of claim 14 wherein the acoustic transducers are used to measure a first time interval for said ultrasonic pulse traveling in a first direction along said pre-selected path; and wherein the acoustic transducers are used to measure a second time interval for said ultrasonic pulse traveling in a second direction opposite to said first direction along said pre-selected path; and wherein the said first time interval and said second time interval are used to calculate the air velocity along said pre-selected path; and wherein said air velocity is used by the controller to optimize the thermal comfort of the occupant.

* * * * *